United States Patent
Okamoto

(10) Patent No.: US 6,501,786 B1
(45) Date of Patent: Dec. 31, 2002

(54) DIRECT SPREAD SPECTRUM COMMUNICATION SYSTEM CORRESPONDING TO DELAYED MULTIPLEX MODE, AND METHOD OF COMMUNICATION USING THE SYSTEM

(75) Inventor: Naoki Okamoto, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/367,384

(22) PCT Filed: Feb. 25, 1998

(86) PCT No.: PCT/JP98/00757
§ 371 (c)(1),
(2), (4) Date: Aug. 13, 1999

(87) PCT Pub. No.: WO98/42094
PCT Pub. Date: Sep. 24, 1998

(30) Foreign Application Priority Data

Mar. 18, 1997 (JP) .............................................. 9-065026

(51) Int. Cl.[7] .............................................. H04L 27/30
(52) U.S. Cl. ........................ 375/141; 375/363; 370/506; 370/537; 370/538
(58) Field of Search .................................. 375/363, 364, 375/140, 141, 142, 150; 370/342, 441, 479, 506, 532, 537, 538

(56) References Cited

U.S. PATENT DOCUMENTS

| | | | | |
|---|---|---|---|---|
| 5,291,486 A | * | 3/1994 | Koyamagi ..................... 370/84 |
| 5,291,515 A | * | 3/1994 | Uchida et al. .................. 375/1 |
| 5,615,227 A | * | 3/1997 | Schumacher, Jr. et al. .. 375/206 |
| 5,859,843 A | * | 1/1999 | Honkasalo et al. .......... 370/342 |
| 5,862,133 A | * | 1/1999 | Schilling ..................... 370/342 |
| 6,064,678 A | * | 5/2000 | Sindhushayana et al. ... 370/470 |
| 6,147,964 A | * | 11/2000 | Black et al. ................. 370/209 |
| 6,163,566 A | * | 12/2000 | Shiino ......................... 375/143 |
| 6,175,558 B1 | * | 1/2001 | Miya ........................... 370/335 |

FOREIGN PATENT DOCUMENTS

| | | |
|---|---|---|
| JP | 8265215 | 10/1996 |
| JP | A955714 | 2/1997 |
| JP | 9055714 | 2/1997 |
| JP | A9247123 | 9/1997 |
| JP | 9247123 | 9/1997 |
| JP | A9270735 | 10/1997 |
| JP | 9270735 | 10/1997 |
| JP | A9298491 | 11/1997 |

\* cited by examiner

*Primary Examiner*—Stephen Chin
*Assistant Examiner*—Dac V. Ha
(74) *Attorney, Agent, or Firm*—Birch, Stewart, Kolasch & Birch, LLP

(57) ABSTRACT

A direct spread spectrum communication system in accordance with a delayed multiplex mode in which improvement in correlation and improvement in error rate can be perfectly realized in any data length. A data generating section appends addition bits so as to generate an integral multiple of information to be transmitted, from data received from an upper (MAC) layer. The symbol length of a data part is determined from information obtained from the upper layer, and the generating section knows the symbol length of a bit synchronization section, a frame synchronization section and a various information section in the system, which should be originally appended as a packet. Therefore, the number of additional bits are added so that the total number of symbols amounts to an integral multiple of the data to be multiplexed.

9 Claims, 9 Drawing Sheets

(1) The number of additional symbols ≥ (TransitionalSection + Unstable Section)

(2) (The number of additional symbols + The number of Symbols in a multiplex section) = m × v(Multiplex number) [m: Integer]

DIRECT SPREAD SPECTRUM COMMUNICATION SYSTEM CORRESPONDING TO DELAYED MULTIPLEX MODE, AND METHOD OF COMMUNICATION USING THE SYSTEM This application is the national phase under 35 U.S.C. §371 of PCT International Application No. PCT/JP98/00757 which has an International filing date of Feb. 25, 1998 which designated the United States of America.

FIELD OF THE INVENTION

The present invention relates to a spread spectrum communication and more particularly to a spread spectrum communication system conforming to a delayed multiplex mode transmission, and a method of communication using the system.

BACKGROUND OF THE INVENTION

Spread spectrum communication systems have recently been developed, and have attracted a great deal of public attention as a new and interesting communication method. A typical modulation system used in conventional data communication systems is a narrow band modulation system which can be realized by relatively small circuitry, but which is weak to interference such as multipath interference and narrow band color noises. Such may occur indoors in offices and workplaces. On the contrary, the spread spectrum communication system is free from the above-mentioned problem since it can spread a data spectrum with a spread code and transmit the spread-spectrum coded data in a wide band.

The spread spectrum communication system, however, has a disadvantage of requiring a widened bandwidth to transmit data at a high speed. For example, a bandwidth of 22 MHz is required to realize spread-spectrum transmission of QPSK (Quadrature Phase Shift Keying) modulated data with 11 chips of spread code at a transmission rate of 2 Mbps. Namely, the bandwidth of 110 MHz is needed to transmit data at 10 Mbps. The fact that radio transmission has a restriction on bandwidth makes it more difficult to realize the high-speed data transmission by the spread-spectrum communication method.

Accordingly, a method for multiplexing spectrum signals with a delay (hereinafter called "Delayed multiplex system") has been proposed as a method of transmitting data within a limited bandwidth at a high speed, which is described in Japanese Patent Application No. 7-206159.

The use of this method can increase the data transmission rate within a limited bandwidth. For example, the data transmission rate 2 Mbps at 22 MHz (as described before) can be increased to 4 Mbps by multiplexing the data twice and further to 10 Mbps by multiplexing the data five times.

FIG. 6 shows a typical block diagram of a conventional system used for proposed delayed multiplex transmission method. In FIG. 6, data generated by a data generating section 10 is differentially coded by a differential coding section 11 and then converted to parallel sets of data to be multiplexed by a series-to-parallel (S/P) converting section 12. The parallel data sets are transferred to respective multiplying sections (13-1~13-5) whereby they are spread by multiplying by a PN code received from a PN generator 14. Then, the parallel data sets are delayed respectively by the delay elements (15-1~15-5).

The delayed parallel data sets are combined by a frequency combining section 17 to form multivalued digital signals which are then modulated with oscillation of an oscillator 18 by a modulator 17 and transmitted through a frequency converter 19 and a power amplifier 20.

The high-speed data transmission within the limited bandwidth is thus accomplished.

However, the delayed multiplex data transmission still encounters an increase in error rate from interference between multiplexed signals.

Accordingly, the inventor of the present application also proposed a method for improving the correlation and error rate for the delayed multiplex transmission (Japanese Patent Application No. 8-13963).

FIG. 7 shows a typical circuit diagram of a conventional delayed multiplex system by which improvement in error rate has been realized. This example is described below. The transmission system is the same with the system shown before in FIG. 6. In the receiving system of FIG. 7, a received frequency signal is converted to a base band signal by a frequency converting section 21 and correlated by a correlator 23. The correlation is latched by a latch section 24 at the timing of a correlating spike and, then, is recovered from the deterioration due to auto-correlation by a correlation processing section 25. This correlation output is distributed by a distributor 26. The signal is controlled by a latch controller 29 and latched by latch sections 27 and 28. According to the aforementioned actual example, the signal is latched with 2 chips or 3 chips.

The signal is differentiated by a differential section 30 and discriminated and demodulated by a discriminating section 31.

FIG. 8 is a typical construction block diagram of the correlating processing section of FIG. 7. This depicts a five-multiplex case. In FIG. 8, there is shown only one line that must be doubled for realizing the system of FIG. 7.

An input signal is input to shift registers 25S corresponding to the number of input bits. The registers hold correlation spikes by four before and after a desired demodulation timing spike. An arithmetic unit 25P with a selecting function carries-out operations on the signals at a timing signal generated by a timing signal generator 25T which matches the timings of input and output according to signals from a correlation synchronizing circuit (not shown in FIG. 8).

FIG. 9 is a block diagram showing a typical internal construction of the arithmetic unit with a selecting function, which is shown in FIG. 8.

The use of the unit of FIG. 9 can considerably decrease a change in amplitude of a signal due to the influence of an auto-correlation side-lobe, and can therefore make a great improvement in error rate. The operation of this unit is as follows:

As seen in FIG. 9, signals A and F are input to a selector 25P1, signals B and G are input to a selector 25P2, signals C and H are input to a selector 25P3 and signals D and I are input to a selector 25P4. In this instance, the selectors 25P1–25P4 select signals A, B, C and D respectively. The selected signals A–D are added together by an adder 25P5 and then divided by 11 by a divider 25P6. The resultant signal is added to E' by an adder-subtracter 25P9, then latched by a latching section 25P8 and output.

In the example shown, preceding and proceeding correlation signals are used for improvement of the correlation output. When received signals are 5-multiplex signals, each signal is composed of five blocks and five correlatin outputs are used for improvement in correlation. However, five blocks cannot be obtained due to the transmitted data length.

FIG. 10 is a conceptual illustration of an exemplified state of five-multiple data. In the case shown, there is no data in the two last blocks (i.e., the two last symbols are lost) since these signals, (outputs of respective delay elements) before being multiplexed, do not have the data length of a multiple of 5. Consequently, data consisting of 128 symbols is divided into 5 groups, each consisting of 5 blocks of 5 symbols, and thus 3 symbols remain, as shown in FIG. 10. In this instance, the conventional correlation-improved circuit cannot exert a sufficient effect of improving the correlation because blocks of coded signals are partly omitted. Thus, an error rate for the last three symbols worsens. In packet communication, 1 bit error causes retransmission of data. Therefore, an increase in error rate for above-mentioned symbols decreases the throughput of the packet transmission system.

SUMMARY OF THE INVENTION

In view of the above-mentioned problems, the present invention was made to provide a direct spread spectrum communication system conforming to a delayed multiplex mode transmission and a communication method using the system, which can realize improvement in correlation and improvement in error rate in any data length by applying the above mentioned technical means featuring the present invention.

(1) In view of the above-mentioned problems, the present invention was made to provide a direct spread spectrum communication system conforming to a delayed multiplex mode transmission and a communication method using the system, which can realize improvement in correlation and improvement in error rate in any data length by applying the above mentioned technical means featuring the present invention.

(2) Another object of the present invention is a direct spread spectrum communication system conforming to a delayed multiplex mode as defined in above item (1), which is featured in that the system is further provided with means adapted for transmitting and receiving a simplex signal directly spread with a spread code.

(3) Another object of the present invention is to provide a direct spread spectrum communication system conforming to a delayed multiplex mode as defined in any of above items (1) and (2), which is featured in that the means are adapted to cause the number of additional bits to be an integer multiple of the multiplex number multiplied by the number of bits composing a unit to be processed by the system.

(4) Another object of the present invention is to provide a direct spread spectrum communication system conforming to a delayed multiplex mode for transmitting and receiving a plurality of series of signals directly spread by using a spread code and multiplexed by using multiplexing means for multiplexing signals at a delay time of any desired number of chip codes, which is further provided with means for appending an additional bit or bits before the start of a multiplex section following to a simplex section in a signal format for setting signals to be transmitted and received in a simplex mode and a multiplex mode.

(5) Another object of the present invention is to provide a communication method using any one of the direct spread spectrum communication systems mentioned above items (2) to (4) conforming to a delayed multiplex mode, which method is featured in that a length of additional bits to be inserted is set to a length corresponding to a transit period during which the operation of the system is unstable after switching the transmission mode from the simplex mode to the multiplex mode can be stabilized.

(6) Another object of the present invention is to provide a communication method, using any one of the direct spread spectrum communication systems mentioned above item (2) conforming to a delayed multiplex mode, which is featured in that an additional bit or bits having no relation to transmissive data are inserted before the start of a multiplex section following to a simplex section in a signal format for setting signals to be transmitted and received in a simplex mode and a multiplex mode.

(7) Another object of the present invention is to provide a communication method, using any one of the direct spread spectrum communication systems mentioned above items (5) and (6) conforming to a delayed multiplex mode, which is featured in that error correction such as convolutional coding in the multiplex section is applied to a format of data to be transmitted in the multiplex mode according to the signal format in such a way that the appendable additional bit or bits are given specific data according to the error correction scheme to use for training of error correction processing.

(8) Another object of the present invention is to provide a communication method, using any one of the direct spread spectrum communication systems mentioned above items (5) to (7) conforming to a delayed multiplex mode, which is characterized in that the system uses a specific data format that allows error checking such as CRC to be conducted on only the data omitting the additional bit or bits appended thereto.

(9) Another object of the present invention is to provide a communication method, using any one of the direct spread spectrum communication systems mentioned above items (5) to (8) conforming to a delayed multiplex mode, characterized in that the number of additional bits is an integer multiple of the multiplex number multiplied by the number of bits composing a unit to be processed by the system.

In the communication system according to the present invention, every packet may contain complete blocks with no omitted symbol, even in the last section thereof, by appending additional bits so as to form a packet consisting of, e.g., five blocks when the number of multiplexed signals is 5. This may solve the problem of increasing an error rate due to lack of or omission of a last symbol when multiplexing signals, which is required in prior art systems.

In the communication system for transmitting data having a simplex section and multiplex section, the transmission error rate of the whole system and the packet throughput of the system can be improved by selectively appending additional bits to the multiplex sections.

The additional bits interposed between a simplex section and a multiplexed section can prevent the transmit data from being affected by the unstable operations of digital and analog circuits during a transitional period after switching from a simplex section to a multiplexed section, consequently increasing the throughput of the communication system of the present invention. In detail, the additional bit section is placed between a simplex section and a multiplexed section in such a way that ① the number of the bits included the additional bit section corresponds to a time longer than that required for stabilizing the operation of the system (i.e., the length of transitional section plus the unstable section) and ② a total number of added symbols (bits) and symbols in the multiplexed section is an integer multiple of the multiplex number. The data format thus defined enables the additional bits to protect data against the influence of unstable period of the system and improve the transmission error rate of the system due to a lacking of a block.

The content of additional bits is controlled so as to cause the bits to function as the preprocessed section for convolutional coding of the data. Thus, the transmit data from the head (effective bit) can be effectively corrected for possible error in the format when conducting error correction with the convolutional codes.

CRC (Cyclic Redundancy Checking) can be conducted on only the effective data, omitting the additional bits and the calculation with the additional bits. This assures effective error detection and the improved throughput of the whole system.

The number of additional bits is selected to be equal to a common multiple of the multiplex number and a unit of bits (e.g., 8 bits) to be processed by the system, whereby the transmission length can be represented in a byte unit. Thus, calculation using fractions is not needed, thereby facilitating communication processing.

PREFERRED EMBODIMENTS OF THE INVENTION

Figure 1A:
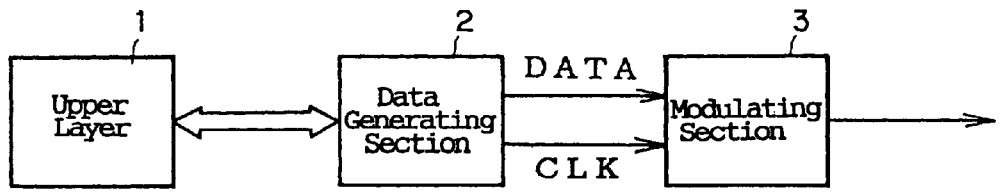
FIG. 1 shows an example of construction of data blocks to be used for a communication system according to an aspect of the present invention.
Figure 1:
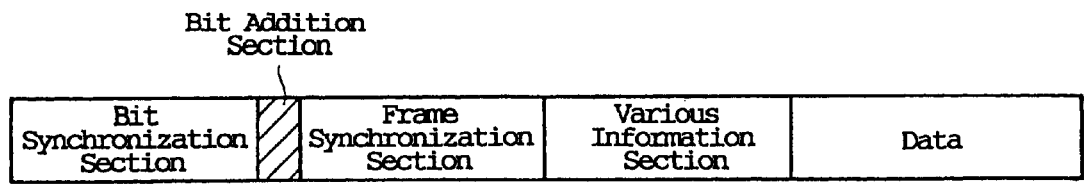
Figure 1:
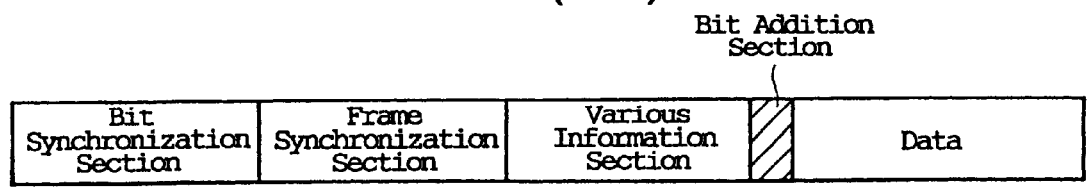
Figure 1:
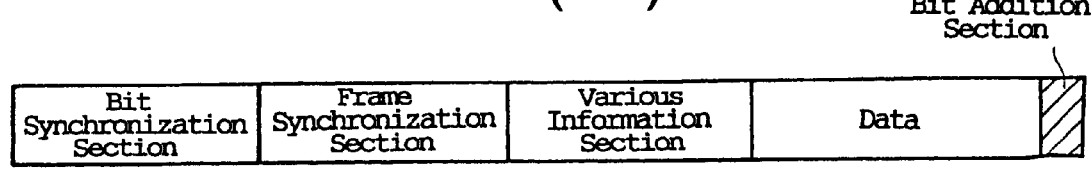

Referring now to FIG. 1, a first preferred embodiment of the present invention will be described as follows:

FIG. 1 is a view for explaining an example of constructing data blocks to be used for a communication system according to the present invention.

In the general digital communications such as packet communications, transmissions are usually controlled by an upper layer 1 called MAC layer as shown in FIG. 1.

A data generating section 2 is capable of generating transmit information from data received from the upper layer 1 by appending an additional bit to the data using a bit appending means, so that the data has a specified length that is an integer multiple of the number of multiplexed data blocks.

Any packet in packet communications usually must include a bit synchronization section, a frame synchronization section and a various information section as essential data and then a main transmittable data section.

The data transferred from the upper layer is placed in this main data section.

On the other hand, the bit synchronization section, the frame synchronization section and the various information sections are appended by the data generating section 2. The various information sections include an error correction mode, a packet length, a scramble method, etc.

In radio communications, the bit synchronization section is used for wave detection, carrier restoration and clock reproduction data. The receiving terminal recognizes receipt of transmitted data according to the bit synchronization section and makes the above-described preparation for receiving the transmitted data. In this instance, the data length of, e.g., 256 bits is used.

When m series of 31-bit patterns are in the frame synchronization section, the receiving terminal knows the data start timing according to the specified bit pattern and recognizes what information each bit carries by calculation on the timing data.

FIG. 1 shows three examples of data blocks used in the embodiment of the present invention.

An example (B1) of FIG. 1 is a data block in which an additional bit is interposed between a bit synchronization section and a frame synchronization section. In this instance, the terminal knows the symbol length of a data part can be known from information received from the upper layer 1. Since symbol lengths of a bit synchronization section, a frame synchronization section and a various information section are previously known, the number of additional bits required to adjust the total number of symbols to be an integer multiple of the data blocks to be multiplexed is placed before the frame synchronization section. The total number of symbols of, e.g., five data blocks to be multiplexed is such that it can be divided by 5.

Because of this, a packet can have five complete data blocks and does not suffer any lacking or omitted symbols in the last part. This can eliminate the possibility of increasing the error rate due to a lack or omission of a last symbol in a packet. The error rate in packet communications can be improved and the problem present in the prior art system have encountered can be thus solved.

In this instance, the total number of symbols in a packet is increased by additional bits placed before the frame synchronization section in each data block but no need for changing of data to be demodulated is caused since each data block can be demodulated referring to the frame synchronization.

An exemplified data block (B2) of FIG. 1 has an additional bit section placed before a data section, thereby the start timing of the data section may be changed. In this instance, a various information section before the additional bit section can include information as to the number of added bits so as to correctly find the header of the data section. This also eliminates the possibility of increasing the error rate due to a lack of a last symbol in a packet.

An exemplified data block (B3) of FIG. 1 has an additional bit section placed after the end of a data section, i.e., where a symbol is lacking. In this instance, the data length (packet length) is previously specified and indicated in a various information section, thus preventing demodulation of the additional bits appended to the data section.

In some systems, the operating mode is automatically switched to the transmission mode on completion of receipt of data. Added bits only compensate lack of a symbol in an incomplete one of blocks multiplexed blocks and may be therefore negligible in relation to a switching time. In this instance, it is also possible to eliminate the possibility of increasing the error rate of a packet due to a lack of a symbol in the last one of the multiplexed blocks.

The addition of additional bits may be conducted in any of three examples (B1), (B2), (B3) of FIG. 1, which may be selected in accordance with the purpose of the practical application.

In the above described example, the additional bits were added by the data generating section 2 to the data received from the upper layer. In some systems, the upper layer prepares all the data, which of course can selectively use the above-mentioned examples (B1), (B2) and (B3) of FIG. 1.

An exemplified data block (B3) of FIG. 1 has an additional bit section placed after the end of a data section, i.e., where a symbol is lacking or missing. In this instance, the data length (packet length) is previously specified and indicated in a various information section, thus preventing demodulation of the additional bits appended to the data section.

In some systems, the operating mode is automatically switched to the transmission mode on completion of receipt of data. Added bits only compensate a lack of a symbol in an incomplete block that is to be multiplexed, and may therefore be negligible in relation to a switching time. In this instance, it is also possible to eliminate the possibility of increasing the error rate of a packet due to a lack of a symbol in the last one of the multiplexed blocks.

Therefore, a simplex section has common information including the number of multiplexed signals, enabling the receiving terminal to selects the same multiplex number. The transmitting terminal can transmit signals multiplexed in the selected number, while the receiving terminal can receive the signals, having aligned itself to the number of multiplexed signals. This enables the communication system to realize data communication in an optimal multiplex mode in accordance with the state of the communication channel.

Figure 2A:
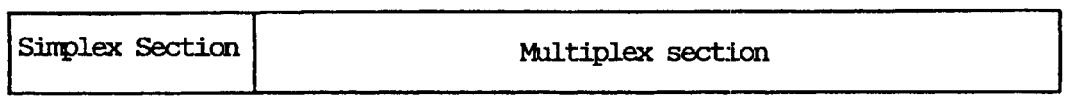
FIG. 2 shows an example of construction of data blocks to be used for a communication system having a simplex section and a multiplexed section according to another aspect of the present invention.
Figure 2B:
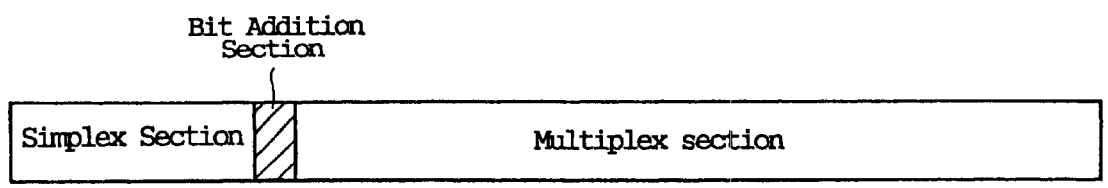
Figure 2C:
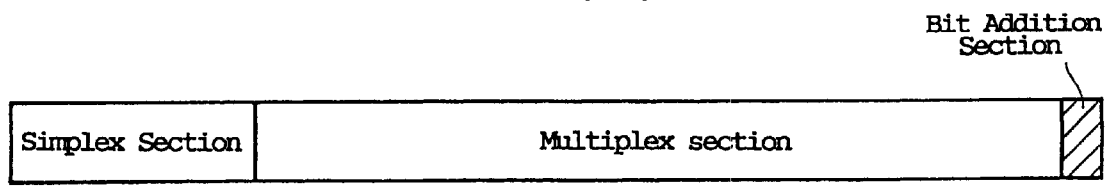

FIG. 2 depicts a construction of data transmitted in a transfer format having a simplex section and a multiplex section, which is used in the communication system according to an aspect of the present invention. A data structure (A) of FIG. 2 is used in the prior art system, wherein a simplex section (not multiplexed section) followed by a multiplex section contains common information necessary for bit synchronization, frame synchronization, the number of multiplexed signals and so on.

Accordingly, additional bits, proposed by the present invention, can be interposed in places shown in the example (B) and (C) of FIG. 2.

Additional bits are written in the place (B) of FIG. 2 so that the number of symbols in each of the multiplexed blocks can be an integer multiple of the number of the multiplexed blocks. In this instance, information about the start position of the effective bits is included in the various information section of the simplex section. Therefore, the data, from which the additional bits are previously removed according to the above information, is transferred to the upper layer 2. Consequently, the problem with an increased error rate in the packet, which provides the prior art, can be solved.

On the other hand, the example (C) of FIG. 2 includes additional bits are attached to the end of data written in the multiplexed section. In this instance, the last added part of data section requires no demodulation, and thus the same data required in can be restored by omitting the added part, based on the known number of data included in the information data. Thus, data transmitted and received in the transfer format having the simplex section and the multiplexed section can be treated and improved in the error rate and throughput of packets according to the present invention.

A third embodiment of the present invention is described as follows:

In practice of transmitting data in the format having a simplex section and a multiplexed section by the system described before, analog and digital circuits may have a certain unstable time after the transmission mode is switched from the simplex section to the multiplex section. This is because the clock is switched over to a multiple of the multiplex number and unstable state after switching operation and a change in amplitude of a signal causes an analog circuit to be transitionally unstable.

Figure 3:
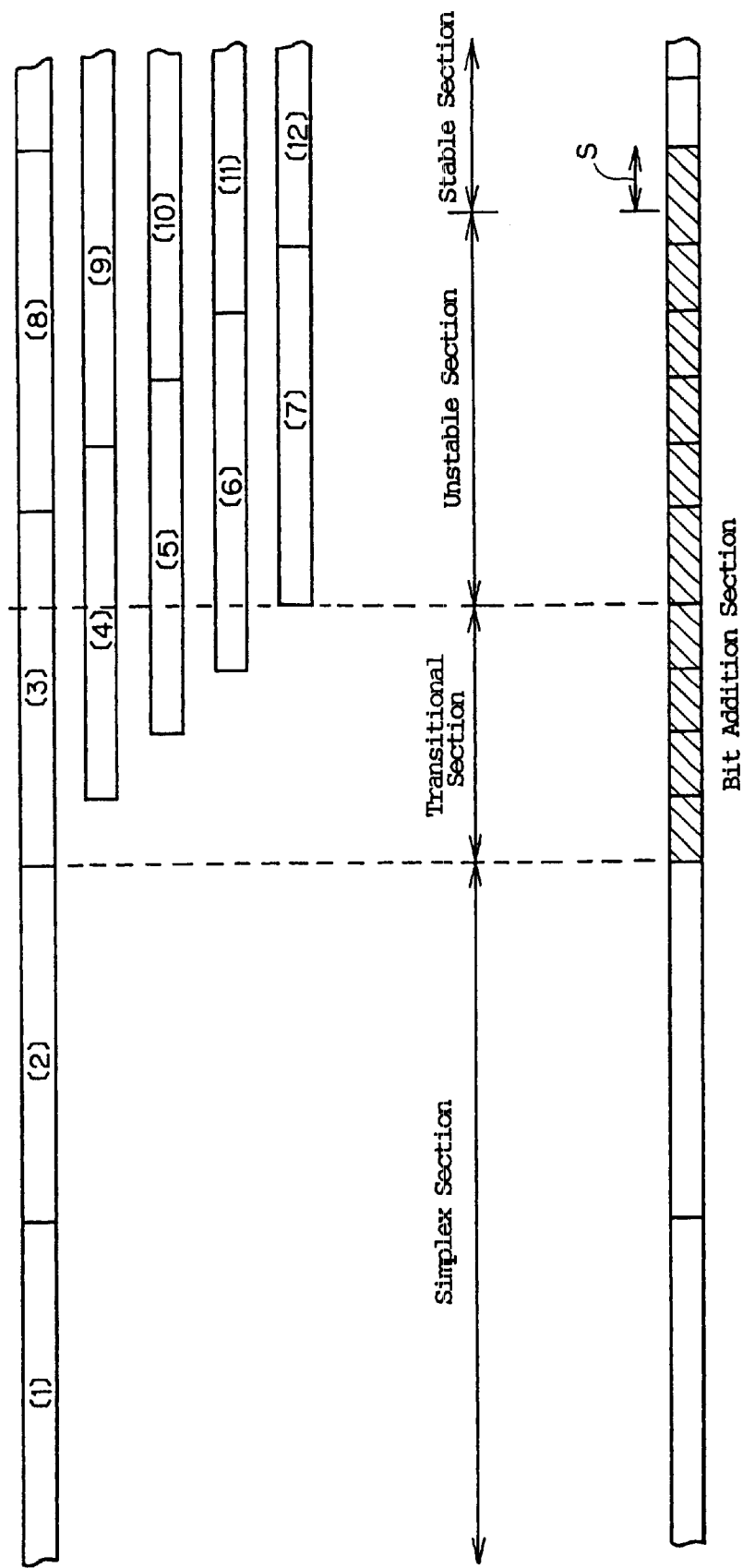
FIG. 3 is a conceptual view for explaining transmission signals multiplexed with switching from a simplex section to multiplex section (for multiplexing five signals) and a state of the received signals.

FIG. 3 is a conceptual view for explaining how the state of transmitting and receiving information changes when switching from a simplex section to a multiplex section.

Spread signals prepared in the simplex section (not multiplex section) are transferred successively one by one, while five spread signals prepared in parallel in the multiplex section are transmitted as multiplexed at a specific delay time.

In FIG. 3, signals [1] and [2] spread with a spreading code are transmitted in the shown order and a transmission mode is changed from the simplex to the multiplex. Signals [3], [4], [5], [6] and [7] are first multiplexed and transmitted at a specific delay time, then signals [8], [9], [10], [11] and [12] are next multiplexed and transmitted at a specific delay time.

In this instance, the group of the signals [3], [4], [5], [6] and [7] relates to so called transitional section featured by coexistence of partly simplex sections and partly multiplex sections and is followed by the group of completely multiplexed signals.

However, the group of completely multiplexed signals may also have a certain unstable section until digital and analog circuits become stable. The unstable period of a digital system can be determined as several bits irrespective of a data rate. On the contrary, the time required for stabilizing an analog circuit is generally determined as several microseconds plus a time constant of elements used therein. Therefore, the unstable period of the analog system cannot be of several bits and it depends upon a value determined by dividing a time constant by a transfer rate of the system. Consequently, the number of symbols in the unstable section (period) depends upon the related system and its data rate. These unstable and transit sections serve as a cause of increasing the error rate of the communication system.

To solve the above problem, the embodiment of the present invention provides these sections with additional bits unrelated to data to be transmitted. The number of additional bits is determined as a least value calculated for the analog system. The number of bits can be round-up at the last part S (FIG. 3) between the unstable section and the stable section. It is of course possible to provide a longer protection period against the unstable section in consideration of dispersion of the analog system elements.

The necessary data can be transmitted always in a well-conditioned state assuring an improved error rate and a stable packet throughput.

The number of additional bits can be determined according to properties of a transmitter-receiver and a data rate. It is also possible to put an indication of the number of the added bits as multiplex information included in the simplex section.

According to the present invention, it is possible to transmit data free from the influence of unstable period of the system after switching from a simplex section to a multiplex section by appending unrelating additional bits to the data to be transmitted. This can increase the packet throughput of the communication system.

A fourth embodiment of the present invention is described as follows:

In the third embodiment, the number of additional bits was determined on the basis of the time required for stabilizing the system. However, the number of the bits is desirable to be an integer multiple of the number of multiplexed signals for the reason described before for the first and second embodiments. Accordingly, this embodiment provides a feature that the number of the additional bits corresponds to at least the time required for stabilizing the system and is also an integer multiple of the number of multiplexed signals. The additional bits thus provided can simultaneously exert two kinds of advantageous effects described in all the above-mentioned embodiments.

Figure 4:
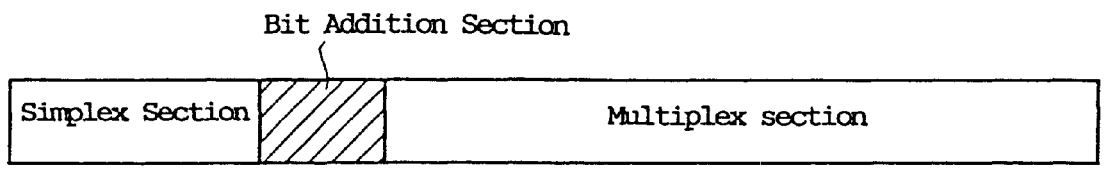
FIG. 4 shows a data format having an additional bit section (with the specified number of added bits) to be used for a communication system according to another aspect of the present invention.

FIG. 4 depicts a data format having a section of the specified number of additional bits, which is used in the embodiments of the present invention. As shown in FIG. 4, an additional bit section is placed between a simplex section and a multiplex section, and ① the number of the bits included in the additional bit section corresponds to a time longer than that required for stabilizing the operation of the system, i.e., the length of transitional section plus the unstable section as shown in FIG. 3 and ② the total number of added symbols (bits) and symbols in the multiplex section is an integer multiple of the number of multiplexed signals.

The data format thus defined can satisfy the above two conditions for additional bits and realize both effects of the additional bits.

A fifth embodiment of the present invention is described as follows:

As described before, the system has a simplex (not multiplex) section and a multiplex section. In the radio channel, the multiplex section has a transmission rate being a multiple of the multiplex number and an increased error rate as compared with the simplex section. For example, a 5-multiplex section may have a C/N (carrier to noise) ratio being worse by 7 dB than that of a simplex section.

Therefore, the error correction is sometimes carried out to improve the error rate of the multiplexed section. Probably the most effective method for error correction is error correction by using convolutional codes.

The convolutional code requires construction of transmit data from data stored in shift registers, causing the data to be uncertain until the data is accumulated in the shift registers. Normally, 1's are initially set in all the shift registers and data to be transmitted is subsequently input to the registers.

With a convolutional code whose constrain length is 7, seven 1's are in the first stage of 7-stage shift registers. When data thus constructed with the convolutional code is demodulated, the first 7 bits are a set of seven 1's that do not concern the transmitted data. To avoid this, a variation may be provided to cause a current packet to also include a last sift-register value of a preceding packet. This attempt, however, is difficult because the packet communication transmits packets each consisting of data completed therein and requires error correction.

According to the present invention, the same error correcting function is given to additional bits inserted between a simplex section and a multiplex section, which construction was realized by the embodiments described before.

Figure 5:
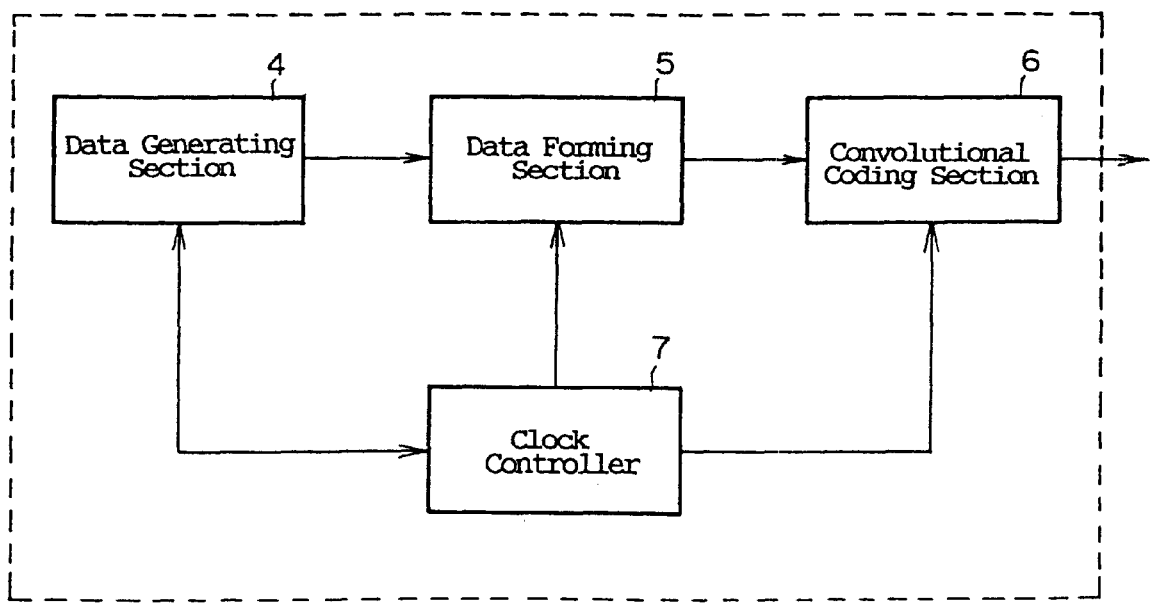
FIG. 5 is a block diagram of an exemplified convolutional coding circuit to be used for a communication system according to another aspect of the present invention.
Figure 6:
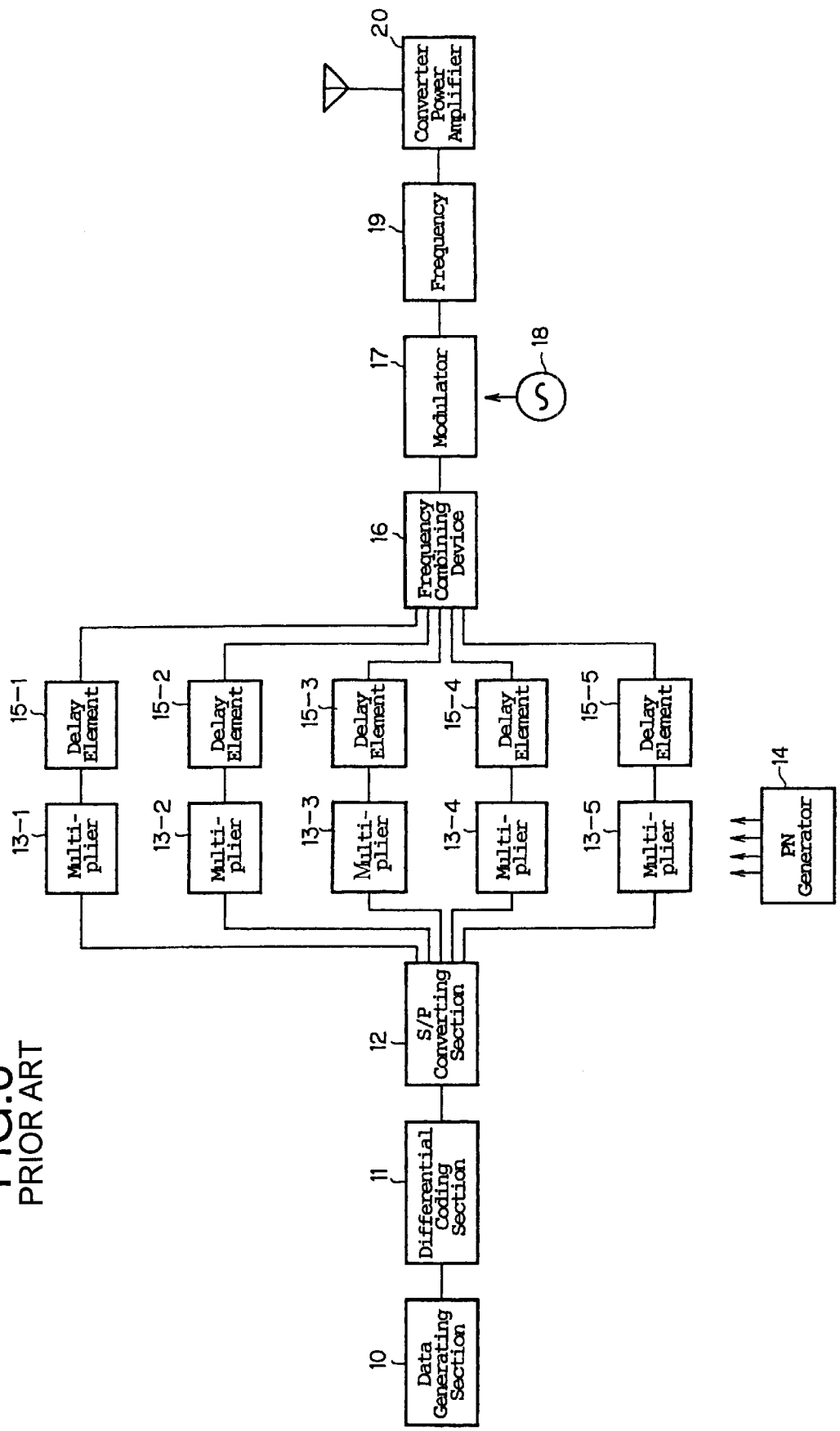
FIG. 6 is a block diagram of an exemplified circuit used for a conventional delayed multiplex mode proposed for a conventional direct spread spectrum communication system.
Figure 7:
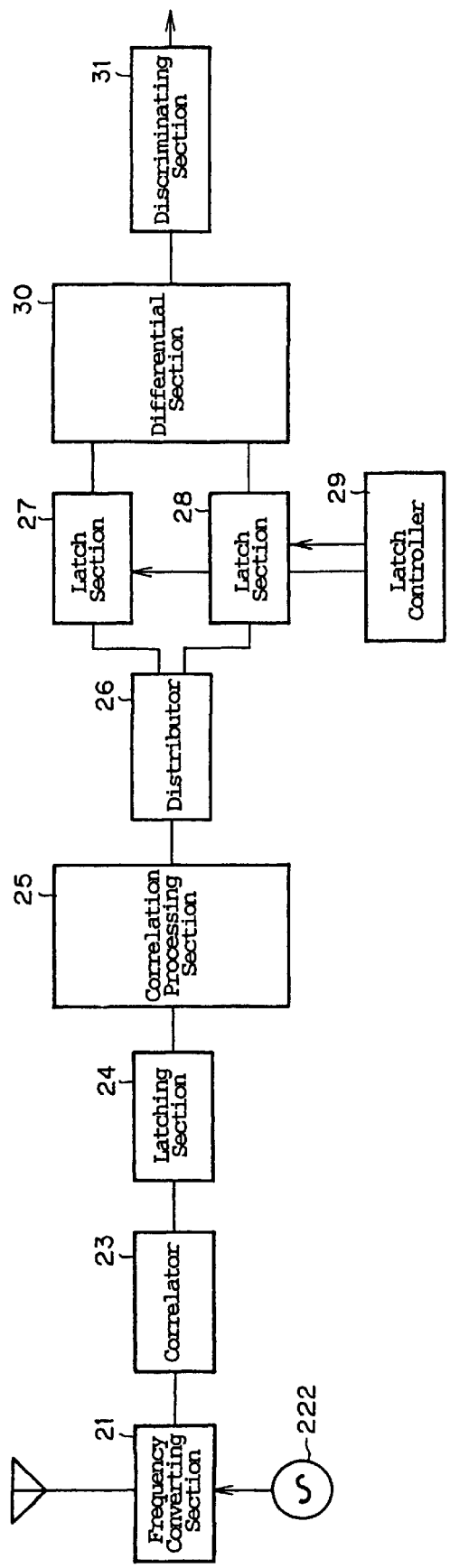
FIG. 7 shows an example of a conventional receiving circuit of a delayed multiplex mode, in which an improvement in error rate has been made.
Figure 8:
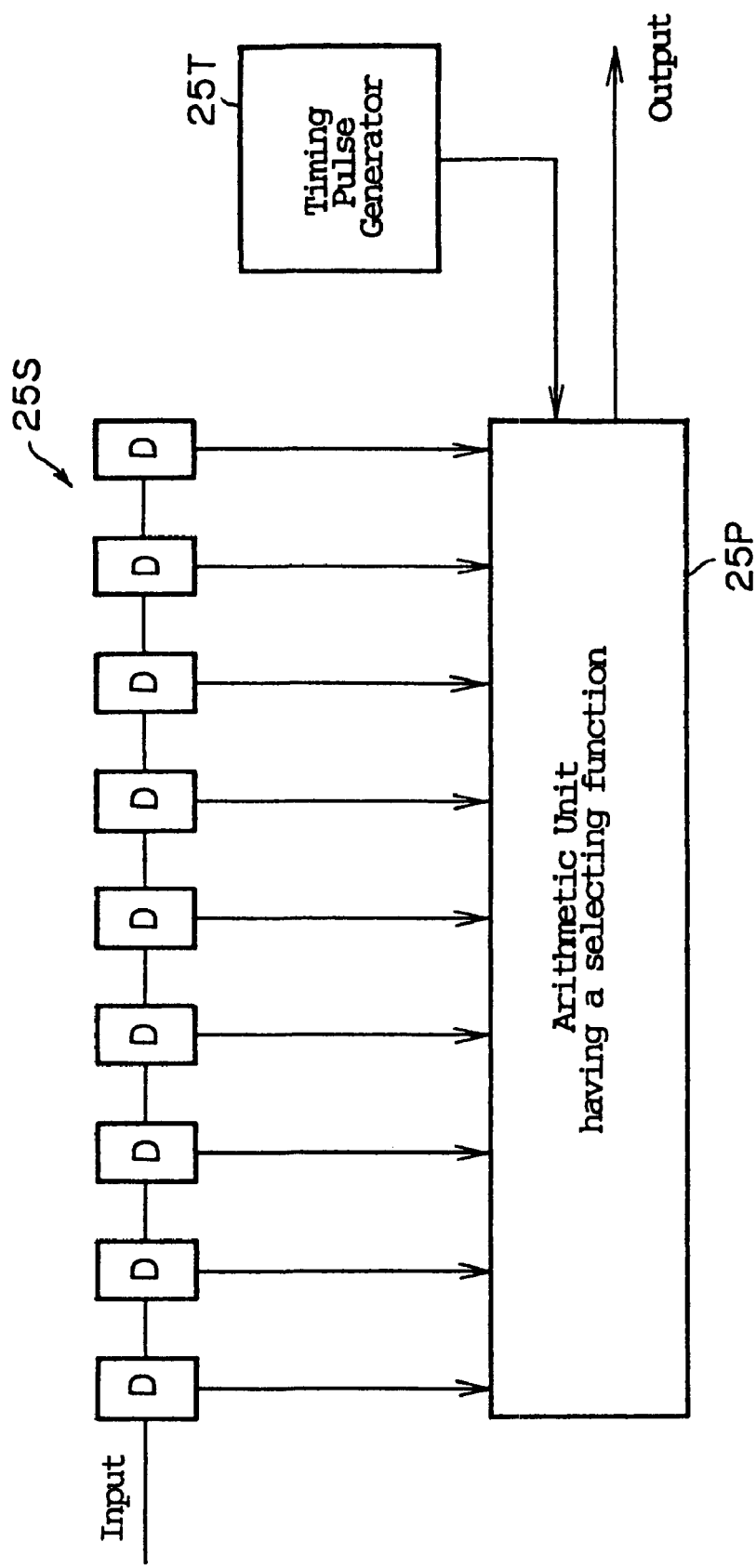
FIG. 8 is a block diagram of an exemplified correlation processing section of the conventional receiving circuit shown FIG. 7.
Figure 9:
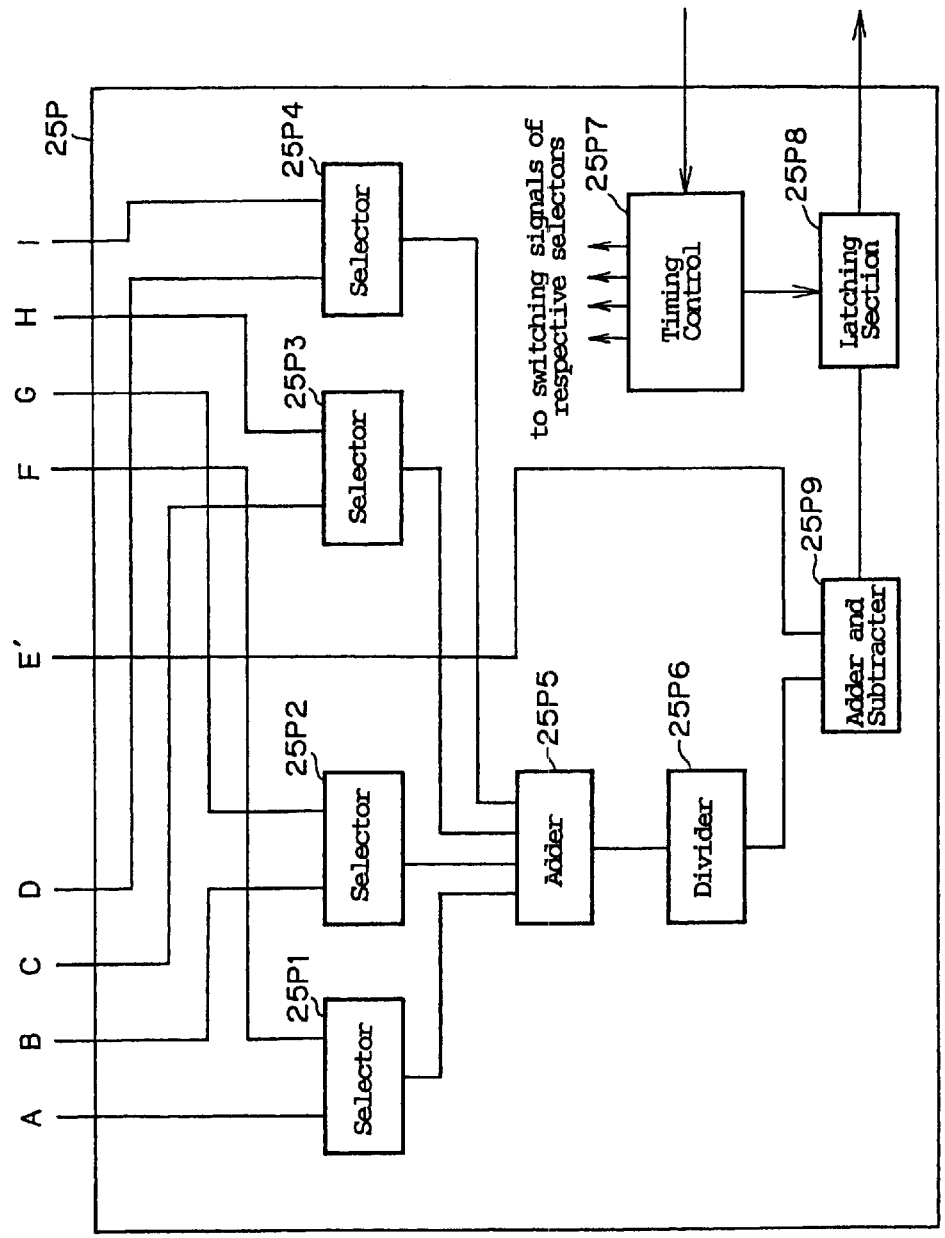
FIG. 9 is a block diagram of an exemplified arithmetic unit having a selecting function, which is used in the correlation processing section of FIG. 8.
Figure 10:
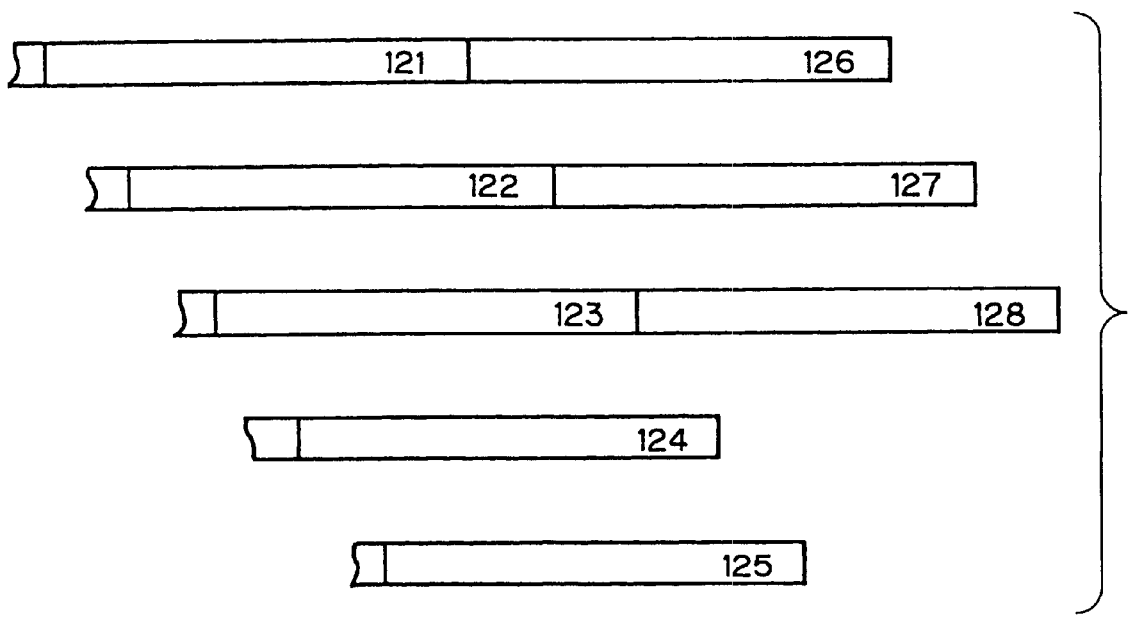
FIG. 10 is a conceptual illustration of an exemplified state of transmit data-blocks in conventional five-multiplexed mode.

FIG. 5 is a construction block diagram of an exemplified convolutional coding circuit. A clock controller 7 controls the operation of a data generating section 4, a data forming section 5 and a convolutional coding section 6. In this instance, convolutional coding can be done at a length reduced to ½ or ¾ as compared with the conventional example described above. Therefore, the data generating rate of the data generating section becomes a half of a transmission rate of the convolutionally coded data.

In view of an additional bit section interposed between the simplex section and the multiplex section, the clock controller 7 prepares a clock substantially twice the data clock to provide timings for inserting the additional bits. The additional bits are given preprocessed data suitable for convolutional coding.

Namely, the additional bits, e.g., seven 1's stored in shift registers, are convolutionally coded from the starting bit of the additional bit sequence. At the receiving terminal, the received convolutionally coded data including the additional bit section are demodulated. The demodulated data sequence beginning from the starting position designated by an information bit is used as effective data.

The additional bits can thus serve as the preprocessed part of the convolutional coding. The data sequence can be corrected for transmission error from the head to the tail end by appending several bits (e.g., 7 bits) to the data end.

The additional bits interposed between the simplex section and the multiplexed section can possess two above-mentioned functions, consequently realizing the effective transmission of the data. The starting position of the effective data sequence is recognized from the information including in the simplex section, thereby the data sequence beginning from the designated data position is transferred to the upper layer.

A sixth embodiment of the present invention is as follows:

In the packet communication, ARQ (Automatic Repeat Request) is normally used besides FEC (Forward Error Correction) including the convolutional codes. With ARC, the error detection is generally made by using CRC (cyclic Redundancy Check).

In the system for transmitting data in the format having a simplex section and multiplex section, CRC may be applied to only the multiplexed section or both the simplex section and the multiplex section. In this embodiment, the CRC can be conducted only on the data sections without the additional bit section interposed between the simplex section and the multiplex section as described before for the third and fourth embodiments. This is because the additional bit section has a worse error rate. With CRC, the effective data section starting from the start bit position designated by information included in the simplex section is checked by calculating the bits of all the data length. Therefore, CRC is conducted on only the effective data sequence omitting the excessive additional bits and excluding the additional bits from the calculation, consequently realizing effective error detection and increasing the throughput of the system.

A seventh embodiment of the present invention is as follows:

In the embodiments described hitherto, the number of additional bits is such that a total of symbols is an integer multiple of the number of multiplexed signals. However, the practical communication systems in many cases process information in a unit of 8-bits or 16-bits. Therefore, data is also formed of 8 bits or 16 bits. The lengths of a packet and effective data contained in a simplex section may be generally represented in a byte unit (8 bits) and in a word unit (16 bits).

On the other hand, a total transmission length may differ from a multiple of 8 or 16 when the number of additional bits was determined as merely an integer multiple of the number of multiplexed signals and appended to the data. This may complicate processing of data and packets.

The seventh embodiment is therefore featured by appending additional bits whose quantity is a common multiple of the multiplexing number and 8. This ensures well-functioning of the additional bits maintaining the transmission length as a common multiple of 8 and 16 not to complicate the processing. The least value is a least common multiple. However, practical systems may achieve the same effect of the additional bits determined as any of the common multiples. The transmission length can be now represented in a byte unit. This eliminates the need of calculation with a fraction, thus preventing the complication of the transmission processing.

The Possible Industrial Applications (1) According to a direct spread spectrum communication system conforming to a delayed multiplex mode and a communication method using the same system of the present invention, each packet contains complete blocks with no lack or omission of a symbol, even in the last section thereof. This is owed to additional bits appended thereto to form a packet consisting of, e.g., five blocks when the number of multiplexed signals is 5. This can completely solve the problem of increasing an error rate due to lacking a last symbol when multiplexing signals, which is a problem in the prior art. Consequently, the performance of the communication system can be improved.

(2) In addition to the above item (1), the communication system and method are adapted to transmission of data having a simplex (not multiplex section) section, improving the transmission error rate of the whole system and the packet error rate.

(3) In addition to the above items (1) and (2), the transmission data length can be represented in a byte unit by appending the specified number of additional bits, which is common multiple of the number of multiplexed data and processing data unit (e.g., 8 or 16 bits). This can eliminate the need of calculation with fractions, thus preventing the complication of transmission procedure.

(4) According to a direct spread spectrum communication system conforming to a delayed multiplex mode and a communication method using the same system of the present invention, the additional bits are interposed between a simplex section and a multiplex section so as to protect the transmit data against any fault that may occur in the system. This can improve the performance of the communication system.

(5) In addition to the above items (2) to (4), the length of the additional bits is determined so as to efficiently protect the data from the influence of the unstable operations during a transitional period after a simplex section is switched to a multiplex section and make the format length be of an integer multiple of the number of multiplexed data. The above additional bits can offer two advantages of protecting the transmit data against the influence of the transitionally unstable period of the system and improving the transmission error rate of the system due to incompleteness of data blocks.

(6) In addition to the above item (2), additional bits inserted between the simplex section and the multiplexed section can prevent the transmit data from being affected by the deterioration of elements used in the system, consequently increasing the packet throughput of the system.

(7) In addition to the above items (5) and (6), the content of additional bits is controlled so as to cause the bits to function as the preprocessed section when convolutional coding of the data, thereby the transmit data from the head (effective bit) can be effectively corrected for possible error in the format when conducting error correction with the convolutional codes.

(8) In addition to the above items (5) to (7), CRC can be conducted on only the effective data, omitting the additional bits and the calculation with the additional bits. This assures effective error detection and an improved throughput of the whole system.

(9) In addition to the above items (5) to (8), the number of additional bits is selected to be equal to a common multiple of the multiplex number and a unit of bits (e.g., 8 bits) to be processed by the system, whereby the transmission length can be represented in a byte unit and the communication processing becomes easier with no need for conducting fractional calculation.

What is claimed is:

1. A direct spread spectrum communication system conforming to a delayed multiplex mode for transmitting and receiving a plurality of series of signals that are directly spread by using a spread code, and which have been multiplexed by using multiplexing means for multiplexing signals at a delay time of any desired number of chip codes, wherein the system further comprises means for detecting the number of bits in transmissive data that are to be multiplexed by the multiplexing means, and for providing the transmissive data with an additional bit or bits appended thereto, wherein said additional bit or bits are added to adjust the total number of symbols that are to be modulated to be an integer multiple of the number of transmissive data that are to be multiplexed by the multiplexing means.

2. A direct spread spectrum communication system conforming to a delayed multiplex mode as defined in claim 1, wherein the system includes means adapted for transmitting and receiving a simplex signal directly spread with a spread code.

3. A communication method using the direct spread spectrum communication system conforming to a delayed multiplex mode as defined in claim 2, wherein, after the transmission mode is switched to multiplex from simplex, a length of additional bits to be inserted is set to a length conforming to a period while the operation of the system is transitionally unstable.

4. A communication method using the direct spread spectrum communication system conforming to a delayed multiplex mode as defined in claim 3, wherein error correction is applied to a format of data transmissive in the multiplex mode according to the signal format so that the appendable additional bit or bits are given specific data to use for training of error correction in accordance with an error correction scheme.

5. A communication method using the direct spread spectrum communication system conforming to a delayed multiplex mode as defined in claim 3, wherein the system uses a specific data format that allows error checking such as CRC to be conducted on only that data omitting the additional bit or bits appended thereto.

6. A communication method using the direct spread spectrum communication system conforming to a delayed multiplex mode as defined in claim 3, wherein the number of additional bits is an integer multiple of the multiplex number multiplied by the number of bits which compose a unit to be processed by the system.

7. A communication method using the direct spread spectrum communication system conforming to a delayed multiplex mode as defined in claim 2, wherein an additional bit or bits having no relation to transmissive data are inserted before the start of a multiplex section that follows a simplex section, in a signal format for setting signals to be transmitted and received in a simplex mode and a multiplex mode.

8. A direct spread spectrum communication system conforming to a delayed multiplex mode as defined of claim 1, wherein said detecting means are adapted to cause the number of additional bits to be an integer multiple of the multiplex number, multiplied by the number of bits which compose a unit to be processed by the system.

9. A direct spread spectrum communication system conforming to a delayed multiplex mode for transmitting and receiving a plurality of series of signals that are directly spread by using a spread code, and which have been multiplexed by using multiplexing means for multiplexing signals at a delay time of any desired number of chip codes, wherein the system further comprises an additional bit section for appending an additional bit or bits, the additional bit section arranged between a multiplex section and a simplex section so that a number of bits included in the additional bit section corresponding to a time exceeding a time required for system operation, and so that the total number of added bits and symbols in the multiplex section is an integer multiple of the number of multiplexed signals.

* * * * *